(12) United States Patent
Allen

(10) Patent No.: US 10,337,618 B2
(45) Date of Patent: Jul. 2, 2019

(54) SEAL ASSEMBLY FOR A STEERING GEAR INPUT SHAFT

(71) Applicant: GM GLOBAL TECHNOLOGY OPERATIONS LLC, Detroit, MI (US)

(72) Inventor: Todd E. Allen, Lake Orion, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 147 days.

(21) Appl. No.: 15/481,966

(22) Filed: Apr. 7, 2017

(65) Prior Publication Data

US 2018/0292009 A1    Oct. 11, 2018

(51) Int. Cl.
   *F16J 15/3284*   (2016.01)
   *B62D 1/20*      (2006.01)
   *B62D 1/16*      (2006.01)
   *F16J 15/00*     (2006.01)

(52) U.S. Cl.
   CPC ............ *F16J 15/3284* (2013.01); *B62D 1/16* (2013.01); *B62D 1/20* (2013.01); *F16J 15/002* (2013.01)

(58) Field of Classification Search
   CPC ........ F16J 15/3284; F16J 15/002; B62D 1/20; B62D 1/16
   See application file for complete search history.

(56) References Cited

U.S. PATENT DOCUMENTS

| 6,182,972 | B1 * | 2/2001 | Orlowski | F16J 15/4478 |
| | | | | 277/350 |
| 6,234,489 | B1 * | 5/2001 | Orlowski | F16J 15/3264 |
| | | | | 277/395 |
| 7,334,660 | B2 * | 2/2008 | Damore | B62D 5/22 |
| | | | | 180/428 |
| 8,469,399 | B2 * | 6/2013 | Allen | F16J 15/3224 |
| | | | | 277/630 |
| 9,296,410 | B2 * | 3/2016 | Isogai | B62D 1/18 |
| 9,587,743 | B2 * | 3/2017 | Jaskot | F16J 15/4476 |
| 9,752,684 | B2 * | 9/2017 | Allen | B62D 1/16 |
| 9,862,412 | B2 * | 1/2018 | Buzzard | B62D 7/224 |
| 9,995,396 | B1 * | 6/2018 | Maskaliunas | F16J 15/3232 |
| 10,138,942 | B2 * | 11/2018 | Dichter | F16C 33/7886 |
| 10,145,473 | B2 * | 12/2018 | Angiulli | F16J 15/3232 |

(Continued)

FOREIGN PATENT DOCUMENTS

| EP | 3078883 B1 * | 1/2019 | | |
| KR | 100549679 B1 * | 2/2006 | ............... | B62D 5/22 |
| WO | WO-03026945 A2 * | 4/2003 | ............... | B62D 5/22 |

*Primary Examiner* — Nicole T Verley
(74) *Attorney, Agent, or Firm* — Quinn IP Law

(57) ABSTRACT

A seal assembly includes a first member and a second member. The first member defines a first central passage, and the second member defines a second central passage, both of which extend along a central axis. An input shaft of a steering gear extends through the first and second central passages. The second member is attached to the input shaft, and is rotatable with the input shaft about the central axis relative to the first member. An outer seal is disposed between and in sealing engagement with the first member and the second member. An inner seal is supported by and moveable with the second member. The inner seal is disposed in sealing engagement with second member and the input shaft of the steering gear. The second member is PTFE fiber filled acetal, and the outer seal is glass filled PTFE to reduce noise generated by relative movement therebetween.

13 Claims, 2 Drawing Sheets

(56) References Cited

U.S. PATENT DOCUMENTS

| | | | |
|---|---|---|---|
| 2008/0191424 A1* | 8/2008 | Gebauer | F16J 15/002 277/402 |
| 2011/0241341 A1* | 10/2011 | Bauer | F01N 13/1811 285/374 |
| 2015/0198252 A1* | 7/2015 | Jason | F16J 15/3404 277/408 |
| 2017/0234434 A1* | 8/2017 | Shuto | B62D 1/16 277/504 |
| 2017/0247956 A1* | 8/2017 | Estrada | E21B 7/062 |
| 2017/0275954 A1* | 9/2017 | Hagar | E21B 4/003 |
| 2018/0017167 A1* | 1/2018 | Ryan | F16J 15/002 |
| 2018/0128376 A1* | 5/2018 | Breusa | F02F 11/007 |

* cited by examiner

SEAL ASSEMBLY FOR A STEERING GEAR INPUT SHAFT

INTRODUCTION

The disclosure generally relates to a seal assembly for an input shaft of a steering gear.

A steering gear may include an input shaft, which extends outward from a gearbox, and which is connected to a steering wheel through one or more intermediate shafts. The input shaft is often sealed to prevent contamination from entering the gearbox, from around a periphery of the input shaft. In some configurations, the steering gear is disposed on an exterior side of a panel, such as but not limited to a front of dash panel of a vehicle, and the input shaft extends through the panel and into an interior side of the panel. In such cases, the input shaft may be sealed to prevent contamination from entering the gearbox from both the exterior side of the panel, as well as the interior side of the panel.

SUMMARY

A seal assembly for an input shaft of a steering gear is provided. The seal assembly includes a first member and a second member. The first member defines a first central passage, which extends along a central axis. The second member defines a second central passage, which extends along the central axis. The second member is rotatable about the central axis relative to the first member. An outer seal is disposed between the first member and the second member. The outer seal is disposed in sealing engagement with the first member. An inner seal is supported by and moveable with the second member. The inner seal is operable to seal between the second member and the input shaft of the steering gear.

In one aspect of the seal assembly, the first member extends along the central axis between a lower end and an upper end, and the second member extends along the central axis between a lower end and an upper end. The second member and the first member overlap each other along the central axis. The lower end of the second member is disposed nearer the lower end of the first member than is the upper end of the first member. The upper end of the first member is disposed nearer the upper end of the second member than is the lower end of the second member. The outer seal is disposed adjacent to the upper end of the first member and the lower end of the second member. The inner seal is disposed adjacent to the upper end of the second member, and is axially spaced from the upper end of the first member along the central axis.

In another aspect of the seal assembly, the second member and the first member at least partially overlap each other in an overlapping region along the central axis. The second member is disposed radially outside of the first member in the overlapping region.

In one embodiment of the seal assembly, one of the first member and the second member defines a groove supporting the outer seal therein. The groove axially positions the outer seal along the central axis.

In one aspect of the seal assembly, the second member is rotatable about and relative to the outer seal. The first member and the outer seal are stationary relative to the second member and the inner seal.

In one embodiment of the seal assembly, the second member is polytetrafluoroethylene (PTFE) fiber filled polyoxymethylene (POM). In one exemplary embodiment, the second member is approximately 25% PTFE fiber filled POM.

In one embodiment of the seal assembly, the outer seal is glass fiber filled polytetrafluoroethylene (PTFE). In one exemplary embodiment, the outer seal is approximately 25% glass fiber filled PTFE.

In one embodiment of the seal assembly, the inner seal is a rubber compound.

A steering system is also provided. The steering system includes a steering gear having a housing and an input shaft extending away from the housing. The input shaft extends along and is rotatable about a central axis. A seal assembly is coupled to the input shaft. The seal assembly includes a first member and a second member. The first member is coupled to the housing, and defines a first central passage extending along a central axis. The input shaft extends through the first central passage, and is rotatable relative to the first member. The second member is coupled to and rotatable with the input shaft. The second member defines a second central passage extending along the central axis. The input shaft extends through the second central passage. An outer seal is disposed between and in sealing engagement with the first member and the second member. An inner seal is disposed between and in sealing engagement with the second member and the input shaft.

In one embodiment of the steering system, the second member is polytetrafluoroethylene (PTFE) fiber filled polyoxymethylene (POM). In one exemplary embodiment, the second member includes between 5% and 50% PTFE fibers by volume.

In another embodiment of the steering system, the outer seal is glass fiber filled polytetrafluoroethylene (PTFE). In one exemplary embodiment, the outer seal includes between 5% and 50% glass fibers by volume.

In another embodiment of the steering system, the inner seal is a rubber compound.

In one aspect of the steering system, the second member is rotatable about and relative to the outer seal. The first member and the outer seal are stationary relative to the second member and the inner seal.

In another aspect of the steering system, the second member and the first member at least partially overlap each other in an overlapping region along the central axis. The second member is disposed radially outside of the first member in the overlapping region.

In one embodiment of the steering system, an exterior seal is attached to the first member. The exterior seal is configured to seal against an exterior surface of a panel.

The above features and advantages and other features and advantages of the present teachings are readily apparent from the following detailed description of the best modes for carrying out the teachings when taken in connection with the accompanying drawings.

DETAILED DESCRIPTION

Figure 1:
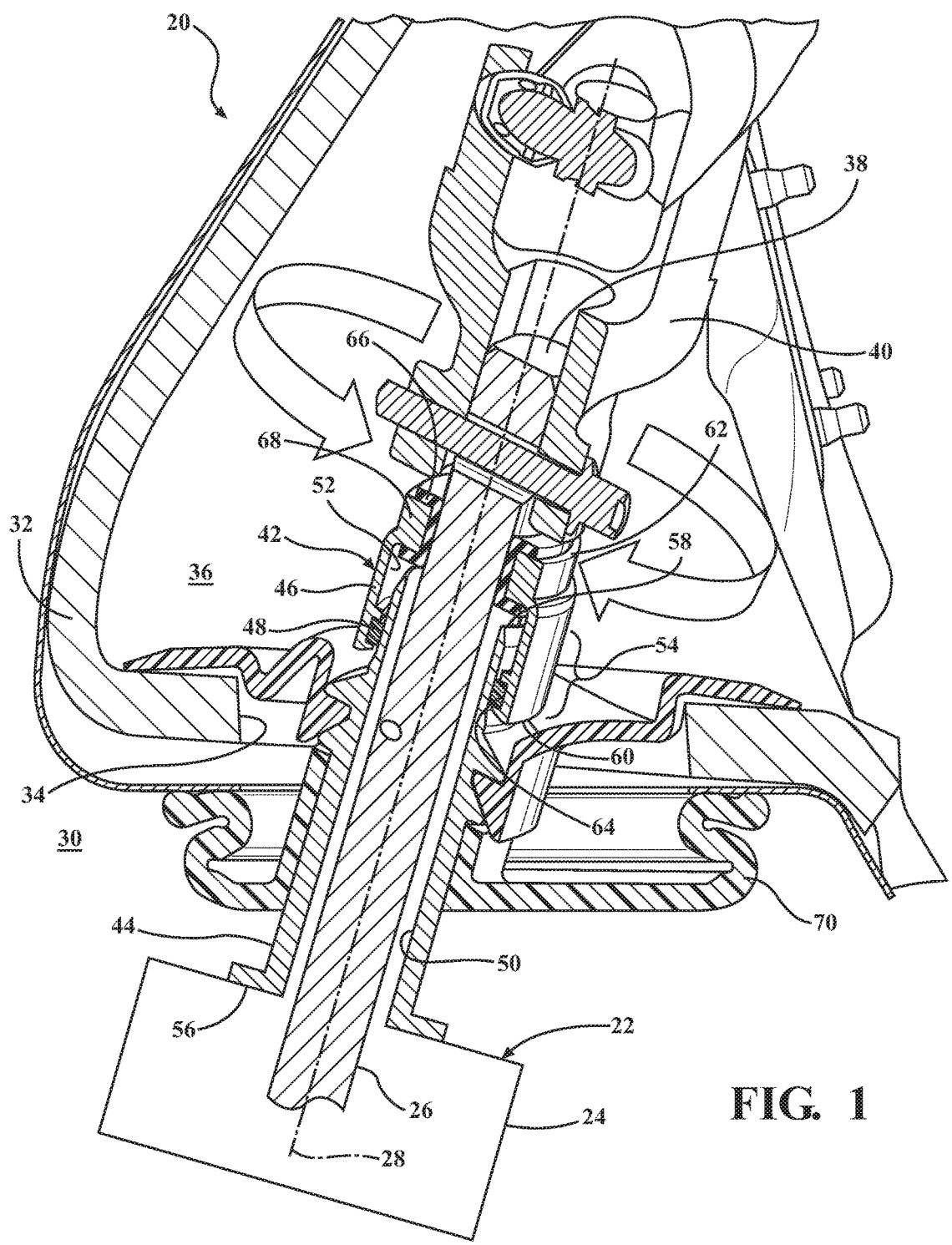
FIG. 1 is a schematic perspective view of a steering system.
Figure 2:
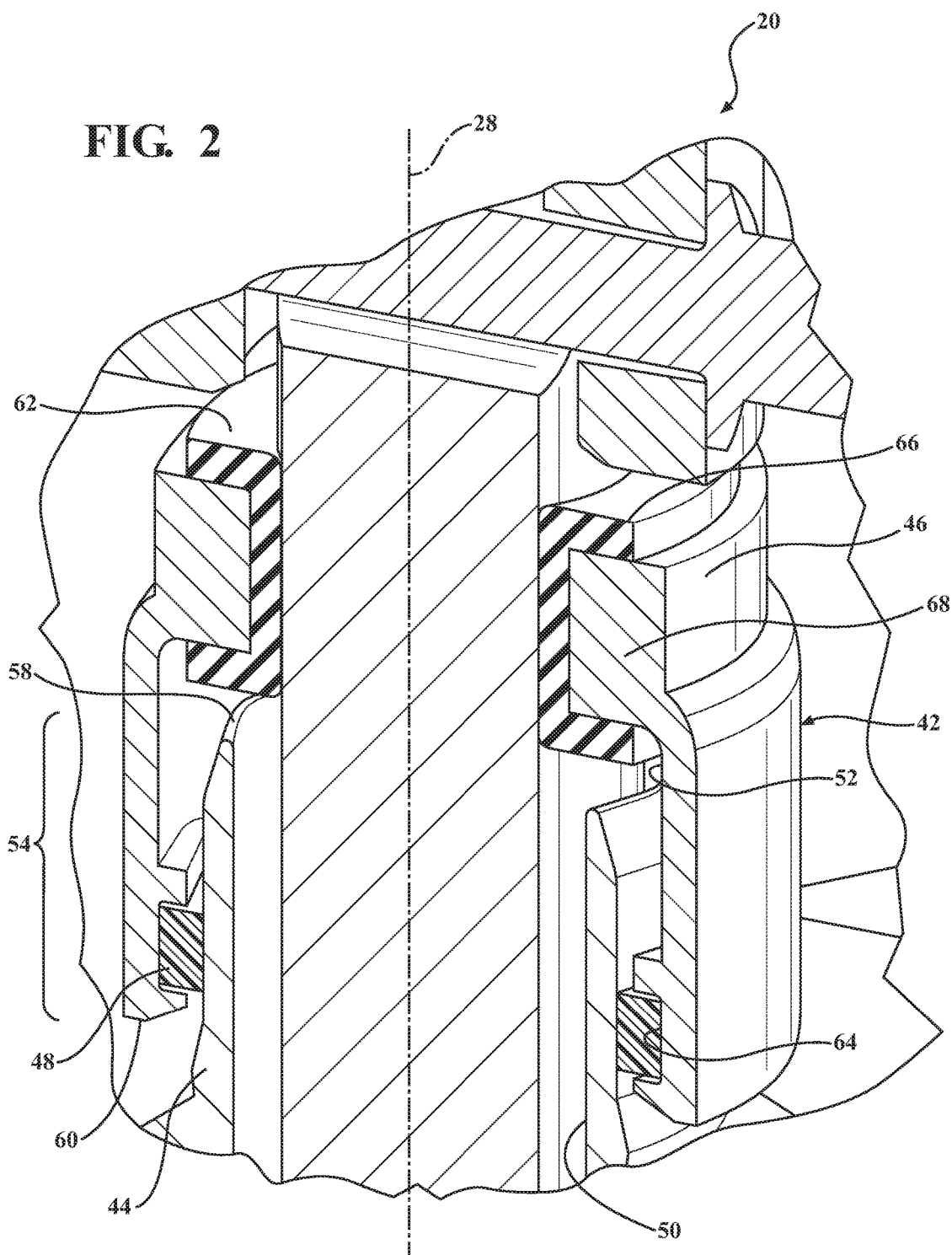
FIG. 2 is an enlarged schematic perspective view of a seal assembly for the steering system.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Referring to the FIGS., wherein like numerals indicate like parts throughout the several views, a steering system is generally shown at 20. The steering system 20 may be configured for a moveable platform, such as but not limited to, a car, a truck, a boat, an ATV, an UTV, a plane, etc.

The steering system 20 includes a steering gear 22. The steering gear 22 includes a housing 24, and an input shaft 26 that extends outward away from the housing 24. The input shaft 26 extends along and is rotatable about a central axis 28. The housing 24 supports a gear system (not shown). Rotational movement of the input shaft 26 moves the gear system, which in turn moves one or more steering wheels of the moveable platform. The specific configuration and operation of the gear system is not pertinent to the teachings of this disclosure, and are therefore not described in detail herein.

As shown in the figures, the exemplary embodiment of the steering system 20 positions the housing 24 of the steering gear 22 adjacent an exterior side 30 of a panel 32. The panel 32 may include, but is not limited to, a front of dash panel 32 of a vehicle. Accordingly, the housing 24 of the steering gear 22 shown in the exemplary embodiment described herein may positioned within an engine compartment of the vehicle. The input shaft 26 extends outward from the housing 24, and passes through an opening 34 in the panel 32, into an interior side 36 of the panel 32. Accordingly, a distal end 38 of the input shaft 26 shown in the exemplary embodiment described herein may be positioned within a passenger compartment of the vehicle. The distal end 38 of the input shaft 26 is coupled to an intermediate shaft 40. The input shaft 26 and the intermediate shaft 40 may be coupled together in a suitable manner, such as but not limited to some form of a universal joint or other similar type of connection. The intermediate shaft 40 is attached to a steering wheel (not shown), which enables an operator to apply steering inputs by rotating the input shaft 26.

The steering system 20 includes a seal assembly 42 that is coupled to the input shaft 26. The seal assembly 42 is operable to seal against the input shaft 26, and prevent or limit contamination from entering the housing 24 around a periphery of the input shaft 26. Particularly, the seal assembly 42 prevents or limits contamination from entering the housing 24 of the steering gear 22 from the interior side 36 of the panel 32. For example, water, dirt, debris, etc., which may be introduced into the interior side 36 of the panel 32 on the feet of the operator may find its way onto the distal end 38 of the input shaft 26. The seal assembly 42 seals the input shaft 26 to prevent that contamination from working downward around the input shaft 26 and into the housing 24 of the steering gear 22.

The seal assembly 42 includes a first member 44 and a second member 46. The first member 44 may be referred to as a chimney, and is attached to the housing 24 of the steering gear 22. The first member 44 forms an inner race for an outer seal 48, described in detail below. The first member 44 defines a first central passage 50 extending along the central axis 28. The input shaft 26 extends through the first central passage 50, and is rotatable relative to the first member 44. In other words, the first member 44 is static or remains stationary relative to the rotational movement of the input shaft 26.

The second member 46 is coupled to and rotatable with the input shaft 26. The second member 46 is rotatable about the central axis 28, with the input shaft 26, relative to the first member 44. The second member 46 forms an outer race for the outer seal 48. The second member 46 defines a second central passage 52, which extends along the central axis 28. The input shaft 26 extends through the second central passage 52. The second member 46 is attached adjacent to the distal end 38 of the input shaft 26.

The second member 46 and the first member 44 at least partially overlap each other in an overlapping region 54 along the central axis 28. The second member 46 is disposed radially outside of the first member 44 within the overlapping region 54. Accordingly, the first member 44 extends along the central axis 28 between a lower end 56 and an upper end 58, and the second member 46 extends along the central axis 28 between a lower end 60 and an upper end 62.

The second member 46 and the first member 44 overlap each other along the central axis 28, within the overlapping region 54, such that the lower end 60 of the second member 46 is disposed nearer the lower end 56 of the first member 44 than is the upper end 58 of the first member 44. Furthermore, the second member 46 and the first member 44 overlap each other such that the upper end 58 of the first member 44 is disposed nearer the upper end 62 of the second member 46 than is the lower end 60 of the second member 46. The overlapping region 54 is defined along the central axis 28, between the lower end 60 of the second member 46, and the upper end 58 of the first member 44.

The outer seal 48 is disposed between the first member 44 and the second member 46, within the overlapping region 54. As such, the outer seal 48 is disposed radially outside of the first member 44 relative to the central axis 28, and is disposed radially inside of the second member 46 relative to the central axis 28. The outer seal 48 is disposed in sealing engagement with the first member 44, and depending upon the level of performance desired for the specific application, the outer seal 48 may also be disposed in sealing engagement with the second member 46. However, in other embodiments, the outer seal 48 may have a little free play relative to the second member 46 in order to allow the second member 46 to rotate freely about the central axis 28. The second member 46 is rotatable about the outer seal 48. Additionally, in the exemplary embodiment described herein, the second member 46 is rotatable relative to the outer seal 48, with the outer seal 48 being stationary relative to the first member 44. The outer seal 48 is disposed adjacent to or near the upper end 58 of the first member 44 and the lower end 60 of the second member 46. In the exemplary embodiment shown in the figures and described herein, one of the first member 44 and the second member 46 defines a groove 64, which supports the outer seal 48 therein. The groove 64 axially positions the outer seal 48 along the central axis 28. As shown in the Figures, an interior surface of the second member 46, which defines the second central passage 52, further defines the groove 64, such that the outer seal 48 is axially positioned along the central axis 28 by the second member 46. However, it should be appreciated that an exterior surface of the first member 44 may alternatively define the groove 64. Furthermore, the outer seal 48 may include some axial free play within the groove 64, along the central axis 28, to enable free rotation of the second member 46 relative to the outer seal 48.

An inner seal 66 is disposed between and in sealing engagement with the second member 46 and the input shaft 26. The inner seal 66 is supported by and moveable with the second member 46. The first member 44 and the outer seal 48 are stationary relative to the second member 46 and the inner seal 66. The inner seal 66 is operable to seal between the second member 46 and the input shaft 26 of the steering gear 22. The inner seal 66 is disposed adjacent to the upper end 62 of the second member 46, and is axially spaced from the upper end 58 of the first member 44 along the central axis 28.

The inner seal 66 may be attached to the second member 46 in a suitable manner. For example, and as shown in the exemplary embodiment and described herein, the inner seal 66 includes a U-shaped cross section along the central axis 28 that mechanically interlocks with a ring portion 68 of the second member 46, which extends radially inward toward the central axis 28. The second member 46 may be attached to the input shaft 26 in a suitable manner. For example, and as shown in the exemplary embodiment described herein, the inner seal 66 is press fit onto the input shaft 26. As such, the inner seal 66 seals between the input shaft 26 and the second member 46, and also interconnects and secures the second member 46 relative to the input shaft 26.

In the exemplary embodiment shown and described herein, the inner seal 66 includes a rubber compound, which includes a durometer that enables a slight oscillation of the input shaft 26 as it rotates about the central axis 28. It should be appreciated that the inner seal 66 may include and be formed from some other suitable compound that enables the input shaft 26 to oscillate, while maintaining a seal therebetween.

Because the second member 46 and the outer seal 48 are in sealing engagement with each other and move relative to each other, i.e., the second member 46 rotates around the outer seal 48, the second member 46 and the outer seal 48 may each be manufactured from materials that limit or reduce friction and noise that may be generated by the relative movement. For example, in the exemplary embodiment described herein, the second member 46 is polytetrafluoroethylene (PTFE) fiber filled polyoxymethylene (POM). In some embodiments, the second member 46 includes between 5% and 50% PTFE fibers by volume. In another embodiment, the second member 46 includes approximately 25% PTFE fibers by volume. It should be appreciated that the second member 46 may include and be manufactured from some other material not described herein. In the exemplary embodiment described herein, the outer seal 48 is glass fiber filled PTFE. In some embodiments, the outer seal 48 includes between 5% and 50% glass fibers by volume. In another embodiment, the outer seal 48 includes approximately 25% glass fibers by volume. It should be appreciated that the outer seal 48 may include and be manufactured form some other material not described herein.

The steering system 20 may further include an exterior seal 70, which is attached to the first member 44. The exterior seal 70 is configured to seal against the exterior surface of the panel 32, and around the opening 34 in the panel 32. The exterior seal 70 prevents or limits contaminants from passing through the opening 34 and entering into the interior side 36 of the panel 32, e.g., the passenger compartment of the vehicle, from the exterior side 30 of the panel 32, e.g., the engine compartment of the vehicle. The exterior seal 70 may include, but is not limited to, a flexible bellows type of seal, or some other device.

The exterior seal 70 is intended to prevent or limit contaminates from passing through the opening 34 and into the interior side 36 of the panel 32, and which may ultimately work their way down the input shaft 26 and into the housing 24 of the steering gear 22. The exterior seal 70 does not limit or prevent contaminates from the interior side 36 of panel 32 from working their way down the input shaft 26 and into the housing 24 of the steering gear 22. However, the seal assembly 42 described herein, which is attached to the distal end 38 of the input shaft 26, is operable to prevent or limit contaminants from the interior side 36 of the panel 32 from working their way into the steering gear 22. Accordingly, whether the contaminates are introduced by an occupant from the interior side 36 of the panel 32, or somehow pass by the exterior seal 70 and into the interior side 36 of the panel 32, the seal assembly 42 described herein seals the input shaft 26 and prevents or limits the contaminants from entering the housing 24 of the steering gear 22.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A seal assembly for an input shaft of a steering gear, the seal assembly comprising:
    a first member defining a first central passage extending along a central axis;
    a second member defining a second central passage extending along the central axis, and rotatable about the central axis relative to the first member;
    an outer seal disposed between the first member and the second member, and disposed in sealing engagement with the first member; and
    an inner seal supported by and moveable with the second member, and operable to seal between the second member and the input shaft of the steering gear.

2. The seal assembly set forth in claim 1, wherein the first member extends along the central axis between a lower end and an upper end, and wherein the second member extends along the central axis between a lower end and an upper end.

3. The seal assembly set forth in claim 2, wherein the second member and the first member overlap each other along the central axis, such that the lower end of the second member is disposed nearer the lower end of the first member than is the upper end of the first member, and such that the upper end of the first member is disposed nearer the upper end of the second member than is the lower end of the second member.

4. The seal assembly set forth in claim 2, wherein the outer seal is disposed adjacent to the upper end of the first member and the lower end of the second member.

5. The seal assembly set forth in claim 4, wherein the inner seal is disposed adjacent to the upper end of the second member, and is axially spaced from the upper end of the first member along the central axis.

6. The seal assembly set forth in claim 1, wherein the second member and the first member at least partially overlap each other in an overlapping region along the central axis, with the second member disposed radially outside of the first member in the overlapping region.

7. The seal assembly set forth in claim 1, wherein one of the first member and the second member define a groove supporting the outer seal therein, and axially positioning the outer seal along the central axis.

8. The seal assembly set forth in claim 1, wherein the second member is rotatable about and relative to the outer seal.

9. The seal assembly set forth in claim 1, wherein the first member and the outer seal are stationary relative to the second member and the inner seal.

10. The seal assembly set forth in claim 1, wherein the second member is polytetrafluoroethylene fiber filled polyoxymethylene.

11. The seal assembly set forth in claim 1, wherein the outer seal is glass fiber filled polytetrafluoroethylene.

12. The seal assembly set forth in claim 1, wherein the inner seal is a rubber compound.

13. The seal assembly set forth in claim 1, wherein the outer seal is disposed in sealing engagement with the second member.

* * * * *